(12) United States Patent
Giachino et al.

(10) Patent No.: US 11,209,944 B2
(45) Date of Patent: Dec. 28, 2021

(54) ELECTRONIC DEVICES WITH GLASS LAYER COATINGS

(71) Applicant: Apple Inc., Cupertino, CA (US)

(72) Inventors: Marta M. Giachino, Palo Alto, CA (US); Manish Mittal, San Jose, CA (US); Matthew S. Rogers, San Jose, CA (US); Que Anh S. Nguyen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 71 days.

(21) Appl. No.: 16/420,072

(22) Filed: May 22, 2019

(65) Prior Publication Data

US 2019/0278008 A1 Sep. 12, 2019

Related U.S. Application Data

(63) Continuation of application No. 15/809,886, filed on Nov. 10, 2017, now Pat. No. 10,353,123.

(60) Provisional application No. 62/542,762, filed on Aug. 8, 2017.

(51) Int. Cl.
*G02B 5/28* (2006.01)
*H05K 5/00* (2006.01)
*G06F 3/044* (2006.01)
*C03C 17/00* (2006.01)
*C03C 17/42* (2006.01)

(52) U.S. Cl.
CPC .......... *G06F 3/0443* (2019.05); *C03C 17/009* (2013.01); *C03C 17/42* (2013.01); *G02B 5/286* (2013.01); *H05K 5/0017* (2013.01); *C03C 2217/445* (2013.01); *C03C 2217/478* (2013.01)

(58) Field of Classification Search
CPC ...... G06F 1/1601; G06F 1/1637; G06F 3/044; G09G 3/32; H01L 2251/301; H01L 2251/558; H01L 2251/5338; H01L 27/3244; G02B 5/286
See application file for complete search history.

(56) References Cited

U.S. PATENT DOCUMENTS

| 3,080,270 | A | 3/1963 | Lorenz |
| 4,232,088 | A | 11/1980 | Humphrey, Jr. |
| 5,324,566 | A | 6/1994 | Ogawa et al. |

(Continued)

FOREIGN PATENT DOCUMENTS

| CN | 103677388 A | 3/2014 |
| CN | 105975126 A | 9/2016 |

(Continued)

*Primary Examiner* — Antonio Xavier
(74) *Attorney, Agent, or Firm* — Treyz Law Group, P.C.; G. Victor Treyz; David K. Cole

(57) ABSTRACT

An electronic device may have a display and a rear housing. A coating may be formed on an inner surface of a display cover layer for the display or on an inner surface of the rear housing. The coating may include one or more inorganic layers such as inorganic layers in a thin-film interference filter or other layer of material. A buffer layer having a polymer with adhesion promotion additive and embedded silicon oxide particles may be interposed between the coating and a glass layer forming the rear housing or between a patterned indium tin oxide coating on a display cover layer and an adhesive layer that attaches a pixel array to the display cover layer.

19 Claims, 4 Drawing Sheets

(56) References Cited

U.S. PATENT DOCUMENTS

| | | |
|---|---|---|
| 8,014,142 B2 | 9/2011 | Prest et al. |
| 8,467,177 B2 | 6/2013 | Mathew et al. |
| 9,748,518 B2 | 8/2017 | Zeng et al. |
| 9,774,087 B2 | 9/2017 | Chang et al. |
| 2003/0215644 A1 | 11/2003 | Deshpande et al. |
| 2005/0045478 A1 | 3/2005 | Liao et al. |
| 2005/0110020 A1 | 5/2005 | Hayashi et al. |
| 2006/0007524 A1 | 1/2006 | Tam |
| 2006/0046078 A1 | 3/2006 | Richter et al. |
| 2007/0219293 A1* | 9/2007 | Kaskel ................ C08J 3/20 523/333 |
| 2008/0004088 A1 | 1/2008 | Lundell et al. |
| 2008/0122137 A1 | 5/2008 | Hamaoka |
| 2009/0084438 A1 | 4/2009 | Boer et al. |
| 2009/0136723 A1 | 5/2009 | Zhao et al. |
| 2009/0316269 A1 | 6/2009 | Kim et al. |
| 2010/0014232 A1 | 1/2010 | Nishimura |
| 2010/0089637 A1 | 4/2010 | Lin et al. |
| 2011/0051337 A1 | 3/2011 | Weber et al. |
| 2011/0090712 A1 | 4/2011 | Bergeron et al. |
| 2011/0177300 A1 | 7/2011 | Hankey et al. |
| 2011/0177460 A1 | 7/2011 | Shi |
| 2011/0285640 A1 | 11/2011 | Park et al. |
| 2012/0129090 A1 | 5/2012 | Mamak et al. |
| 2013/0169912 A1 | 7/2013 | Ooishi et al. |
| 2014/0028572 A1 | 1/2014 | St. Clair |
| 2014/0078412 A1 | 3/2014 | Franklin et al. |
| 2014/0210836 A1* | 7/2014 | Zhong ................ G09G 3/3466 345/530 |
| 2014/0226207 A1 | 8/2014 | Gangopadhyay et al. |
| 2014/0272298 A1 | 9/2014 | Memering et al. |
| 2014/0367242 A1 | 12/2014 | Chen et al. |
| 2015/0077646 A1 | 3/2015 | Chen et al. |
| 2015/0109245 A1* | 4/2015 | Chou ................ G06F 3/0446 345/174 |
| 2015/0195915 A1 | 7/2015 | Namkung et al. |
| 2015/0301464 A1 | 10/2015 | Peter et al. |
| 2015/0351292 A1 | 12/2015 | Chang et al. |
| 2015/0355399 A1 | 12/2015 | You et al. |
| 2015/0382448 A1 | 12/2015 | Pennathur et al. |
| 2016/0005886 A1 | 1/2016 | Zou, III et al. |
| 2016/0111684 A1 | 4/2016 | Savas et al. |
| 2016/0117018 A1* | 4/2016 | Lin ................ G06F 3/0446 349/12 |
| 2016/0141219 A1* | 5/2016 | Liu ................ H01L 21/02263 257/737 |
| 2016/0160035 A1 | 6/2016 | Watanabe et al. |
| 2016/0202732 A1 | 7/2016 | Shi et al. |
| 2016/0209691 A1 | 7/2016 | Yang et al. |
| 2016/0304721 A1* | 10/2016 | Hippmann ................ C09D 7/62 |
| 2017/0102810 A1 | 4/2017 | Satake |
| 2017/0117503 A1* | 4/2017 | Harikrishna Mohan ................ H01L 51/5253 |
| 2017/0155081 A1 | 6/2017 | Zeng et al. |
| 2017/0156227 A1 | 6/2017 | Heo et al. |
| 2017/0246690 A1 | 8/2017 | Murphy et al. |
| 2017/0247290 A1 | 8/2017 | Oudard et al. |
| 2017/0287992 A1 | 10/2017 | Kwak et al. |
| 2017/0345152 A1 | 11/2017 | Han et al. |
| 2018/0013086 A1 | 1/2018 | Chou et al. |
| 2018/0090847 A1 | 3/2018 | Romano et al. |

FOREIGN PATENT DOCUMENTS

| | | |
|---|---|---|
| CN | 206179425 U | 5/2017 |
| JP | 2001328846 A | 11/2001 |
| JP | 3780591 B2 | 5/2006 |
| WO | 2016073549 A1 | 5/2016 |

* cited by examiner

ELECTRONIC DEVICES WITH GLASS LAYER COATINGS

This application is a continuation of U.S. patent application Ser. No. 15/809,886, filed on Nov. 10, 2017, which claims the benefit of provisional patent application No. 62/542,762, filed on Aug. 8, 2017, which are hereby incorporated by reference herein in their entireties.

BACKGROUND

This relates generally to electronic devices, and, more particularly, to forming coatings for structures in electronic devices.

Electronic devices such as cellular telephones, computers, watches, and other devices may contain structures that use coatings. For example, electronic devices may have displays that include layers of material for forming pixel arrays and touch sensors. In some devices, a housing structure such as a housing wall may be covered with a layer of glass. Coatings may be formed on displays, housing walls, and other layers of material in electronic devices.

SUMMARY

An electronic device may include electrical components mounted within an interior of a housing. The device may have a display on a front face of the device and may have a glass layer that forms part of the housing on a rear face of the device. Coatings may be formed on structures such as a display cover layer in the display and the glass layer that forms part of the housing. For example, a coating may be formed on the inner surface of the display cover layer facing the interior or the inner surface of a glass rear housing wall facing the interior.

Coatings may include one or more metal layers, one or more organic and/or inorganic dielectric layers (e.g., a thin-film interference filter formed from a stack of inorganic dielectric layers), one or more semiconductor layers, transparent conductive layers, and/or other layers of material.

A buffer layer having a polymer with adhesion promotion additive and embedded silicon oxide particles may be interposed between a coating and a glass layer or other layer. For example, a glass layer in a rear housing wall may be provided with a buffer layer on its inner surface and a coating layer may be formed on the buffer layer. In a display, a buffer layer may be formed on the inner surface of a patterned indium tin oxide layer or other transparent conductive layer on the inner surface of a display cover layer. This buffer layer may be used in coupling a layer of adhesive to the transparent conductive layer. A pixel array or other display structures may be coupled to the display cover layer using the layer of adhesive.

DETAILED DESCRIPTION

Electronic devices may be provided with structures on which coatings are formed. For example, display cover layers, housing walls, optical windows, buttons, and other structures may be formed from glass layers and/or other materials on which coatings are formed. The coatings on these layers may include decorative trim structures, blanket coatings that block light and provide surfaces with desired appearances, and/or patterned coatings that form logos, text, or other visual elements.

Coatings may be deposited using physical vapor deposition (PVD) techniques or other deposition techniques and may include dielectrics, metals, and/or semiconductors. In some configurations, a coating layer may include sublayers such as a stack of dielectric layers with alternating high and low refractive index values that form a thin-film interference filter (e.g., a filter that serves as a fully reflective or partially reflective mirror, a filter that imparts a desired color to a substrate, etc.).

There is a risk that deposition of a physical vapor deposition coating onto a substrate such as a glass layer could create excessive stress in the substrate. To avoid stress-induced damage, a buffer layer may be formed between the substrate and the physical vapor deposition coating.

If care is not taken, buffer layers may sometimes not perform satisfactorily. For example, buffer layers may adversely affect the appearance of overlapping coating (e.g., by imparting an undesired waviness or other undesired attribute to a coating). Due to issues with coefficient-of-thermal-expansion mismatch and lack of adhesion, buffer layers may also sometimes allow overlapping physical vapor deposition coating layers to delaminate.

To address these issues, a buffer layer for coatings such as physical vapor deposition coatings may include materials that enhance buffer layer performance. For example, a buffer layer may be formed from a polymer with embedded particles. The particle may help match the coefficient of thermal expansion of the buffer layer to that of overlapping coatings and may enhance adhesion. The polymer of the buffer layer may also include an adhesion promotion additive. With this approach, coatings for structures such as glass layers and other layers in electronic devices can be provided with enhanced performance and reliability.

Figure 1:
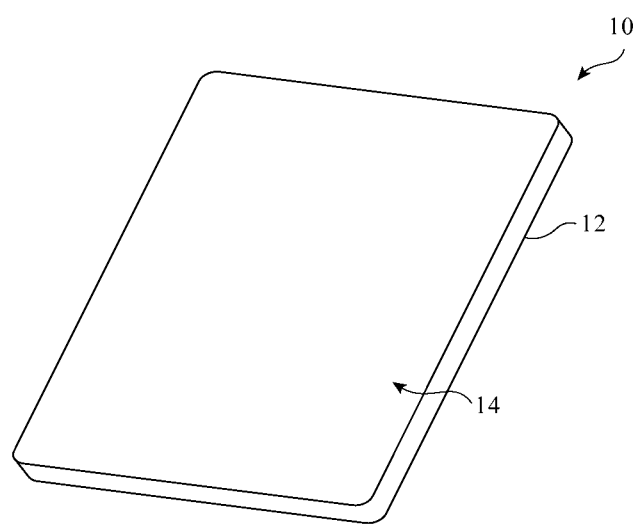
FIG. 1 is a perspective view of an illustrative electronic device in accordance with an embodiment.

An illustrative electronic device is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wristwatch device (e.g., a watch with a wrist strap), a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, wrist device, or other portable computing device. Other configurations may be used for device 10 if desired. The example of FIG. 1 is merely illustrative.

In the example of FIG. 1, device 10 includes a display such as display 14 mounted in housing 12. Housing 12, which may sometimes be referred to as an enclosure or case, may be formed of plastic, glass, ceramics, fiber composites, metal (e.g., stainless steel, aluminum, titanium, gold, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies.

Display 14 may include one or more layers of glass. For example, the outermost layer of display 14, which may sometimes be referred to as a display cover layer, may be formed from a hard transparent material such as glass to help protect display 14 from damage. Other portions of device 10 such as portions of housing 12 and/or other structures may also be formed from glass. For example, walls in housing 12 such as a rear housing wall may be formed from glass.

Figure 2:
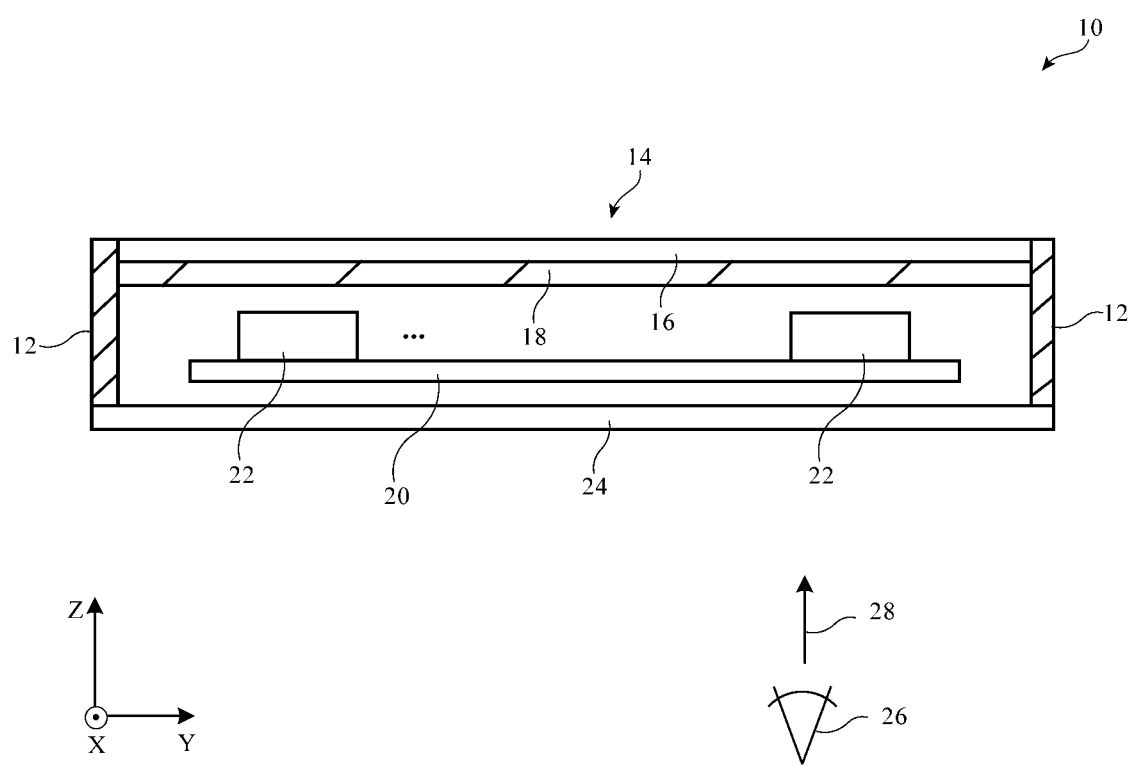
FIG. 2 is a cross-sectional side view of an illustrative electronic device in accordance with an embodiment.

FIG. 2 is a cross-sectional side view of an illustrative device such as device 10 of FIG. 1 that contains glass structures. As shown in FIG. 2, device 10 may have opposing front and rear faces. Display 14 may be formed on the front face of device 10. Housing 12 may have a rear housing wall formed from layer 24 on the opposing rear face of device 10. Portions of housing 12 may also form sidewalls for device 10. These sidewall portions of housing 12 may be formed from a material such metal or integral portions of front and/or rear glass layers, etc.

Display 14 may include display cover layer 16 (e.g., a layer of glass) and display module 18 (e.g., display layers that form an array of pixels that present images for a user on the front face of device 10). Display module 18 may be a liquid crystal display structure, an organic light-emitting diode display structure, or other suitable display. During operation, module 18, which may sometimes be referred to as a pixel array, may present images that are viewable through display cover layer 16. The rear of the housing for device 10 may be formed from a glass structure (e.g., layer 24 may be a glass layer). The thickness of layer 24 may be 0.2-5 mm, at least 0.05 mm, at least 0.1 mm, at least 0.2 mm, at least 0.5 mm, at least 0.75 mm, less than 1 mm, less than 2 mm, or other suitable thickness. If desired, a metal plate or other strengthening structures may be laminated to the inner surface of layer 24 to enhance strength. Internal components in device 10 such as components 22 (e.g., electrical components such as integrated circuits, sensors, etc.) may be mounted on one or more substrates such as printed circuit 20 in the interior of device 10.

Inactive border areas in layer 16, other portions of layer 16, and portions of other glass structures in device 10 such as some or all of glass layer 24 may be covered with coatings and other structures. In some arrangements, a coating may be used primarily to block light (e.g., to hide internal device structures from view). For example, a blanket coating may be formed on the inner surface of glass layer 24 to hide internal components from view by a user such as viewer 26 who is viewing device 10 in direction 28. In other arrangements, a patterned coating may be used to form text, logos, trim, and/or other visible patterns. In still other arrangements, transparent coatings such as patterned indium tin oxide coatings or other transparent conductive layers may be used in forming device components (e.g., a two-dimensional touch sensor formed from an array of indium tin oxide pads on an inner surface of a display cover layer, etc.).

Figure 3:
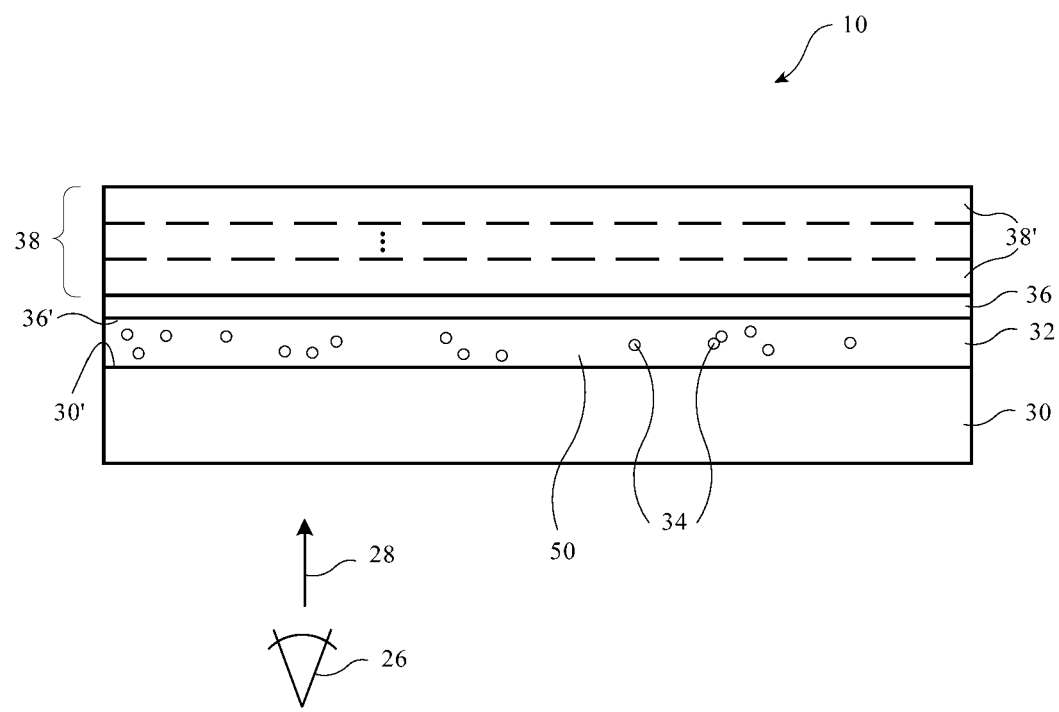
FIG. 3 is a cross-sectional side view of a layer such as a glass layer with a buffer layer and additional layers in accordance with an embodiment.

A cross-sectional side view of an illustrative portion of device 10 with a coating is shown in FIG. 3. In the example of FIG. 3, coating layer 36 and optional additional coating layers such as coating layer 38 have been formed on the inner (interior facing) surface of glass substrate 30. Glass substrate may be, for example, a portion of display cover layer 16, rear housing wall glass layer 24 of FIG. 2, and/or other glass structures in device 10 (e.g., transparent glass windows for an optical component). Coatings for glass structures in device 10 such as coating layer 36 (and optional coating layer 38) may be black or other neutral colors or may have non-black (non-neutral) colors (e.g., blue, red, yellow, gold, rose gold, red-violet, pink, etc.). In some configurations, some or all of the coatings for glass structures in device 10 such as coating 36 (and optional layer 38) may be shiny (e.g., exhibiting a mirror-like reflective surface with a reflectance of at least 50%, at less 80%, at least 95%, less than 99.99%, or other suitable reflectance).

In the example of FIG. 3, coating layers 36 and 38 have been formed on an inner surface of glass layer 30 (facing the interior of device 10 and housing 12) to impart a desired appearance to device 10 when viewed through glass layer 30 in direction 28 from the exterior of device 10. Configurations in which layers 36 (and, if desired, layer 38) are formed on an opposing outer surface of glass layer 30 may be used, if desired. In general, coating(s) on layer 30 may be used in forming antireflection layers, partially reflective layers, light-blocking filters, colored filter layers, antiscratch coatings, antismudge coatings, textured coatings, patterned electrode coatings, multifunctional coatings, and/or other coatings.

Coatings on layer 30 such as coating layers 36 and 38, and/or coatings on other glass structures in device 10 may be formed from metals, semiconductors, and/or dielectrics. Dielectric materials for the coatings may include organic materials such as polymer layers and/or inorganic materials such as oxide layers (e.g., silicon oxide, metal oxides such as aluminum oxide, etc.), nitride layers, and/or other inorganic dielectric materials. In arrangements in which a shiny appearance is desired, a metal coating with a high reflectivity or a thin-film interference filter with dielectric layers (e.g., a stack of dielectric layers of alternating higher and lower refractive index values) may be configured to serve as a mirror coating (reflective coating). If desired, coating 36 may be a thin-film interference filter formed from a stack of inorganic dielectric layers that imparts a desired color to device 10 and/or to blocks infrared light. If desired, one or more layers of ink coatings (e.g., layers in coating layer 38) may be formed on glass layer 30 (e.g., to provide desired colors, opacity, etc.).

In the illustrative configuration of FIG. 3, glass layer 30 may be, for example, a window in housing 12, display cover layer 16, a rear housing wall formed from layer 24, and/or other substrate layer. Glass layer substrates may, in general, be opaque or transparent, may have low haze, may have high haze, and/or may have other optical properties. In the example of FIG. 3, in which viewer 26 is viewing layer 36 through glass layer 30, glass layer 30 is transparent and may have a low haze.

As shown in FIG. 3, buffer layer 32 may be formed on glass layer 30 between coating 36 and glass layer 30. Layer 32 may, for example, have a first (outer) surface that directly contacts and adheres to inner surface 30' of glass layer 30 and may have an opposing second (inner) surface that directly contacts and adheres to outer surface 36' of layer 36. The thickness of layer 32 may be 1-3 microns, at least 0.5 microns, at least 1 micron, less than 4 microns, or other suitable thickness.

Buffer layer 32 may include a binder material such as polymer 50 with embedded transparent inorganic filler particles 34. Polymer 50 may be a clear polymer such as an acrylic-polyester mixture (e.g., a polymer containing acrylic and containing polyester). Other polymer materials such as epoxy, polyester, etc. may be used for polymer 50, if desired.

Polymer 50 may include an adhesion promotion additive such as siloxane (e.g., an additive that forms SiOR groups at the ends of acrylic chains in polymer 50). For example, polymer 50 may be a photoresist such as a hybrid acrylate/siloxane polymer. The adhesion promotion additive (siloxane) helps form bonds between polymer 50 and silicon oxide in glass layer 30, thereby enhancing adhesion between buffer 32 and glass layer 30 at surface 30'. Polymer 50 may have polar groups that chemically bond with coating layer 36 and thereby enhance adhesion at surface 36'. Coating layer 36 may also exhibit good adhesion to the inorganic material of particles 34, so the inclusion of particles 34 can also enhanced adhesion with coating 36.

Particles 34, which may sometimes be referred to as nanoparticles, may have diameters of 10-15 nm, 10-50 nm, at least 7 nm, at least 10 nm, less than 15 nm, less than 60 nm, less than 100 nm, or other suitable diameter. To help match the coefficient of thermal expansion of buffer layer to the coefficient of thermal expansion of layer 30 and thereby help prevent delamination of layer 36, particles 34 may be formed from a material having a coefficient of thermal expansion that is matched to that of layer 30 such as silicon oxide (silica). Other types of particles (e.g., other clear inorganic dielectric particles) may be used if desired. The coefficient of thermal expansion of layer 32 may also be controlled (e.g., lowered) by use of acrylic monomer in polymer 50 that forms a highly cross-linked network in layer 32. Layer 32 may be deposited using any suitable deposition technique (e.g., ink-jet printing).

Layer 32 may have a Young's modulus (elastic modulus) of 5-10 GPa, at last 5 GPa, less than 15 GPa, 8.4 GPa, or other suitable Young's modulus. The hardness of layer 32 may be 300-500 MPa, at least 350 MPa, less than 450 MPa, 410 MPa, or other suitable hardness. The coefficient of thermal expansion of layer 32 may be 200-270*10$^{-6}$/C, at least 100*10$^{-6}$/C, less than 400*10$^{-6}$/C, or other suitable value.

Layer 38 may be formed from one or more sublayers such as layer 38'. Layer 38' may be formed on the inner surface of layer 36 to adjust the outward appearance of layer 36. For example, layer 36 may be partially transmissive to light and may therefore have a color that can be adjusted (at least partially) by adjusting the color of one or more of layers 38'. Layers 38' may include any suitable coating materials. With one illustrative configuration, layers 38' may include one or more ink layers. For example, layer 38 may have a first layer formed on coating 36 such as a first colored ink layer (e.g., a dark gray ink layer, a light gray ink layer, a solid non-neutral colored ink layer, etc.), may have a second layer such as a second colored ink layer (e.g., a dark gray ink layer, a light gray ink layer, a solid non-neutral colored ink layer, etc.), may have a third layer such as an opaque layer (e.g., an optically dense layer formed from metal, black ink, etc.), and may have additional layers such as one or two glue resistant layers, a clear coat (e.g., a clear coat layer optimized for adhesion to adhesive), and an adhesive layer (e.g., an adhesive layer to attach layer 38 to a housing frame). The use of two colored ink layers in this illustrative configuration may help reduce pinholes. Other configurations for layer 38 may be used, if desired.

Figure 4:
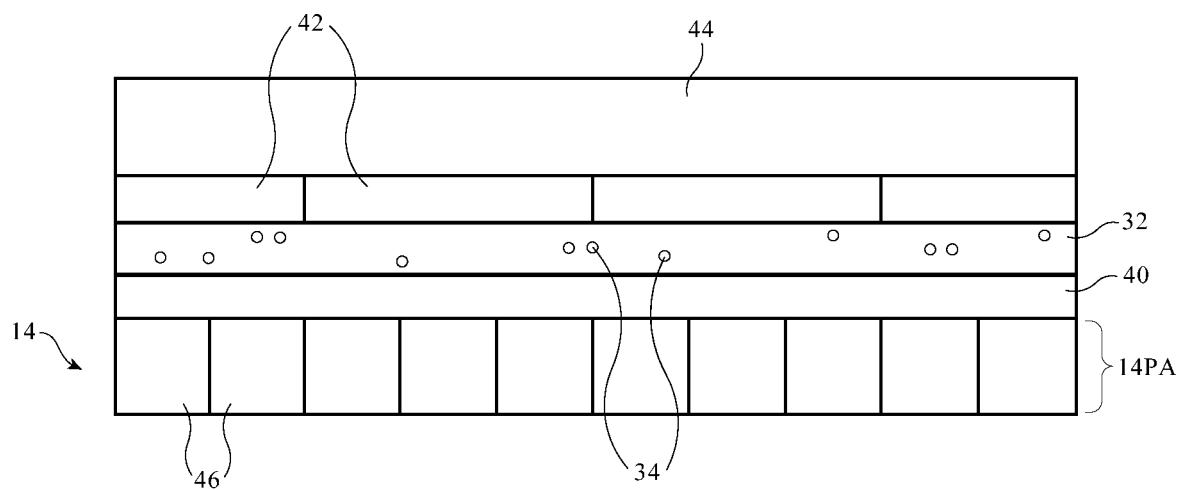
FIG. 4 is a cross-sectional side view of an illustrative display cover layer and associated buffer layer and other layers in accordance with an embodiment.

In the illustrative arrangement of FIG. 4, buffer layer 32 serves as a buffer between coating layer 42 and adhesive layer 40. Coating layer 42 may be formed on the inner surface of layer 44. Layer 44 may be a display cover layer such as layer 16 of FIG. 2. Layer 42 may be a patterned indium tin oxide layer (e.g., a layer deposited by physical vapor deposition on the inner surface 42' of layer 42). Layer 40 may be an adhesive layer that is used in attaching pixel array 14P to buffer layer 32 (and therefore layers 42 and 44). Pixel array 14PA may be a liquid crystal display layer, an organic light-emitting diode layer, or other pixel array such as pixel array (display module) 18 of FIG. 2 that has an array of individually adjustable pixels 46 for displaying images for viewer 25 through layer 44. In this type of arrangement, layer 42 may be patterned to form an array of transparent conductive electrodes for a touch sensor (e.g., an array of capacitive touch sensor electrodes on the inner surface of a display cover layer).

In general, buffer layer 32 may be used in any suitable configuration in which an inorganic PVD layer or a layer deposited using other suitable techniques is being coupled to another layer (e.g., to a glass layer, to a layer of adhesive, etc.). The forgoing configurations are merely illustrative.

The foregoing is merely illustrative and various modifications can be made to the described embodiments. The foregoing embodiments may be implemented individually or in any combination.

What is claimed is:
1. An electronic device having an interior and an exterior, the electronic device comprising:
    a transparent layer that forms an exterior surface, wherein the transparent layer has a first surface facing the exterior and an opposing second surface facing the interior;
    a buffer layer on the second surface of the transparent layer;
    at least one inorganic layer, wherein the at least one inorganic layer has a lower surface and an opposing upper surface, wherein an entirety of the lower surface is directly on the buffer layer, wherein the at least one inorganic layer extends substantially across the buffer layer, and wherein the buffer layer is interposed between the at least one inorganic layer and the transparent layer; and
    at least one ink layer on the at least one inorganic layer.
2. The electronic device defined in claim 1 wherein the buffer layer comprises a binder material and inorganic filler particles embedded in the binder material.
3. The electronic device defined in claim 2 wherein the transparent layer is a glass layer, wherein the inorganic filler particles are transparent nanoparticles, and wherein the binder material comprises an acrylic polyester mix.

4. The electronic device defined in claim 3 wherein the binder material comprises a siloxane promotion additive and wherein the nanoparticles comprise silicon dioxide nanoparticles.

5. The electronic device defined in claim 1 wherein the at least one inorganic layer comprises a stack of dielectric layers of alternating higher and lower refractive index values.

6. The electronic device defined in claim 5 wherein the at least one ink layer comprises a plurality of ink layers and wherein a lowermost ink layer of the plurality of ink layers is in direct contact with an uppermost dielectric layer of the stack of dielectric layers.

7. The electronic device defined in claim 6 wherein the buffer layer has opposing first and second surfaces, wherein the first surface of the buffer layer is on the second surface of the transparent layer, and wherein the second surface is in direct contact with a lowermost dielectric layer of the stack of dielectric layers.

8. The electronic device defined in claim 1 further comprising a display having a cover glass that forms an additional exterior surface that is opposite from the exterior surface formed by the transparent layer.

9. An electronic device having opposing front and rear faces and having an interior, the electronic device comprising:
   a display on the front face;
   a glass layer on the rear face;
   a buffer layer on the glass layer that faces the interior;
   a metal layer on the buffer layer, wherein the buffer layer is interposed between the metal layer and the glass layer, the metal layer has opposing first and second surfaces, the first surface is in direct contact with the buffer layer; and
   at least one ink layer directly on the second surface of the metal layer.

10. The electronic device defined in claim 9 wherein the metal layer comprises a metal selected from the group consisting of: stainless steel, aluminum, and titanium.

11. The electronic device defined in claim 10 wherein the buffer layer comprises inorganic embedded particles and an adhesion promotion additive.

12. The electronic device defined in claim 10 wherein the at least one ink layer comprises a plurality of ink layers and wherein a lowermost ink layer of the plurality of ink layers is in direct contact with the metal layer.

13. The electronic device defined in claim 10 wherein the buffer layer is directly on the glass layer and wherein the metal layer is a physical vapor deposition layer directly on the buffer layer.

14. The electronic device defined in claim 9 further comprising:
   a housing having first and second surfaces that respectively form the front and rear faces, wherein the glass layer forms the second surface of the housing and wherein the display is mounted in the housing at the front surface.

15. An electronic device having an interior and an exterior, the electronic device comprising:
   a glass layer that separates the interior from the exterior;
   a buffer layer on the glass layer that extends substantially across the glass layer, wherein the buffer layer comprises a polymer layer with embedded silicon dioxide particles, wherein the buffer layer has opposing first and second surfaces, and wherein the first surface contacts the glass layer;
   a stack of at least two inorganic dielectric layers, wherein the stack has a lower surface and an opposing upper surface, wherein an entirety of the lower surface is in contact with the buffer layer, and wherein the at least two inorganic dielectric layers extend substantially across the second surface of the buffer layer; and
   a plurality of ink layers on the stack, wherein the stack is interposed between the plurality of ink layers and the buffer layer.

16. The electronic device defined in claim 15 wherein the stack of at least two inorganic dielectric layers comprises a plurality of inorganic dielectric layers with alternating high and low refractive index values that form a thin-film interference filter.

17. The electronic device defined in claim 16 wherein the glass layer has a first surface that faces the exterior and an opposing second surface and wherein the thin-film interference filter forms a partially reflective mirror on the second surface of the glass layer.

18. The electronic device defined in claim 17 wherein the plurality of inorganic dielectric layers are physical vapor deposition layers on the buffer layer and wherein a lowermost inorganic dielectric layer of the plurality of inorganic dielectric layers is in direct contact with the second surface of the buffer layer.

19. The electronic device defined in claim 18 wherein an uppermost inorganic dielectric layer of the plurality of inorganic dielectric layers is in direct contact with a lowermost ink layer of the plurality of ink layers.

* * * * *